Figure 1:
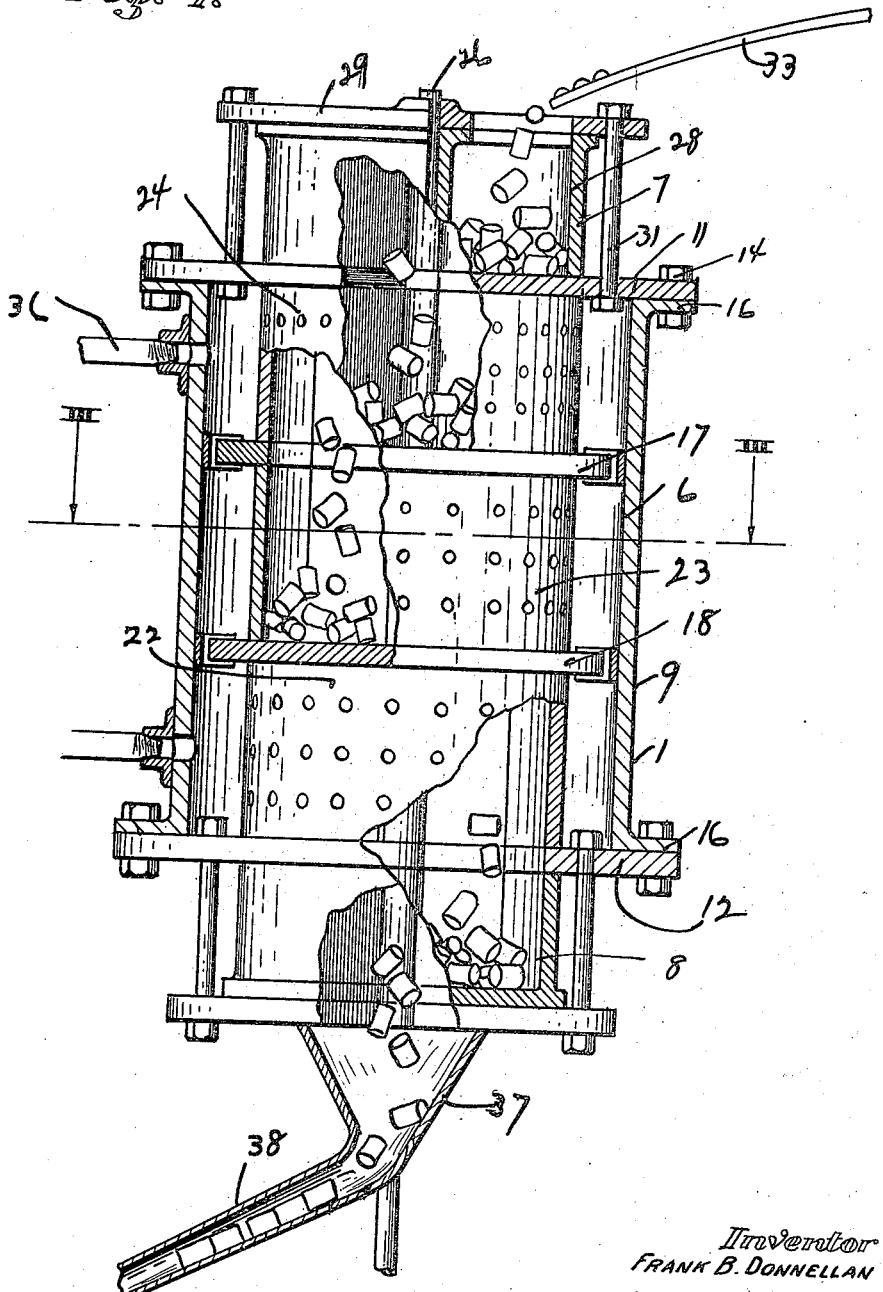

F. B. DONNELLAN.
COOKING RETORT.
APPLICATION FILED SEPT. 3, 1921.
1,426,050.
Patented Aug. 15, 1922.
2 SHEETS—SHEET 2.
Fig. 2.
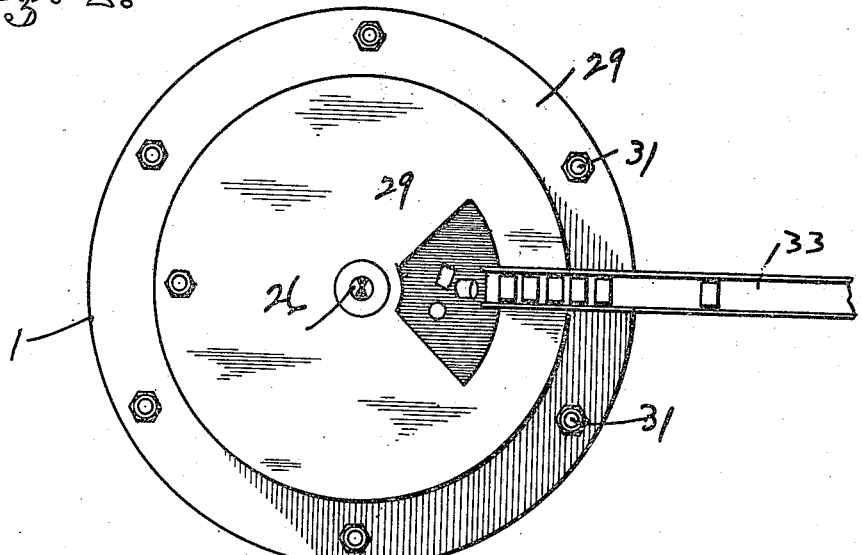
Fig. 3.
Fig. 4.
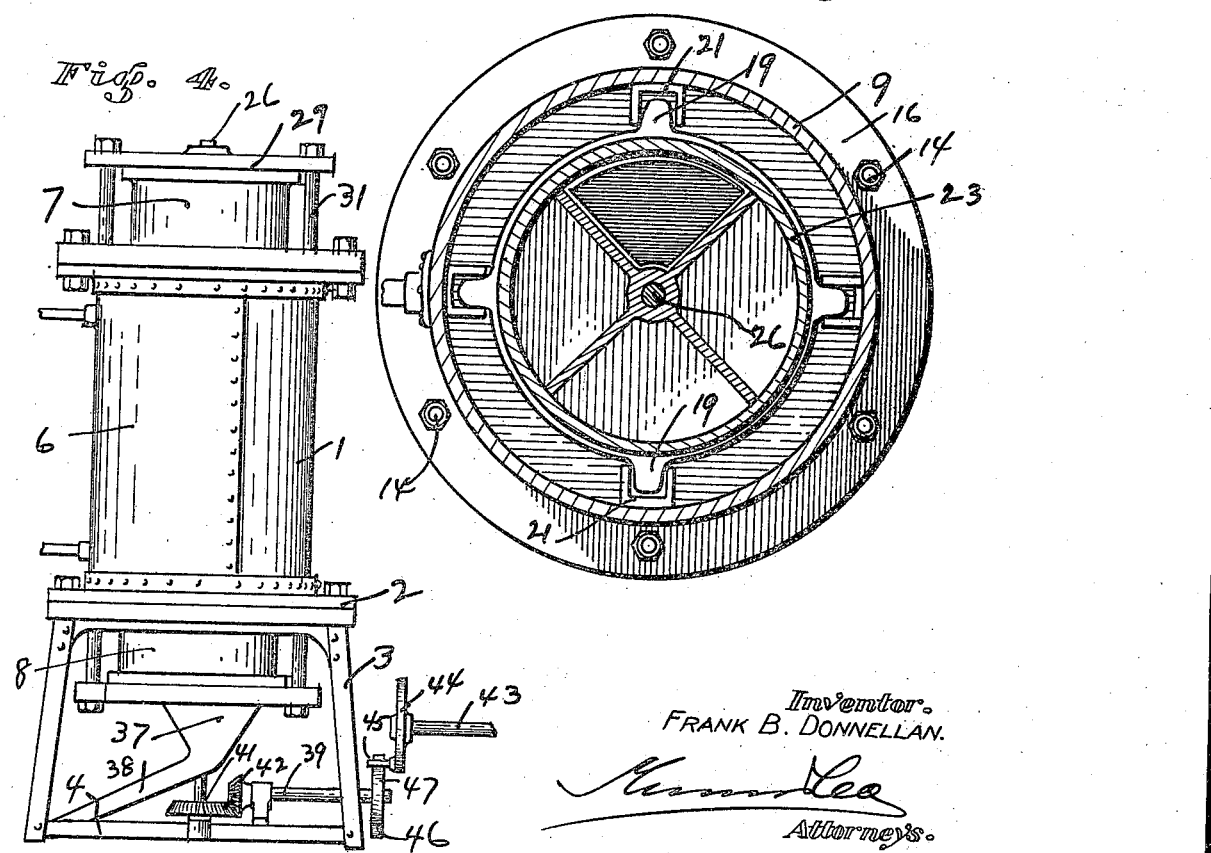
Inventor.
FRANK B. DONNELLAN.
Attorneys.

UNITED STATES PATENT OFFICE.

FRANK B. DONNELLAN, OF SAN FRANCISCO, CALIFORNIA.

COOKING RETORT.

1,426,050.  Specification of Letters Patent.  Patented Aug. 15, 1922.

Application filed September 3, 1921. Serial No. 498,244.

*To all whom it may concern:*

Be it known that I, FRANK B. DONNELLAN, a citizen of the United States, and resident of San Francisco, county of San Francisco, and State of California, have invented a new and useful Cooking Retort, of which the following is a specification.

The present invention relates to cooking retorts for cans generally and more specifically to those retorts in which the cans are heated by steam under compression, and the particular object of my invention is to insert the cans into the retort in such a manner that very little steam is lost during the operation, and to in a similar manner cause the cans to leave the retort without any appreciable loss of steam.

The preferred form of my invention is illustrated in the accompanying drawing, but it is understood that this form can be modified in different ways without involving a departure from the spirit of the invention.

In the drawing, Figure 1 is a side view of my cooking retort, portions of the same being shown broken away; Figure 2 is a top plan view of the same; Figure 3 is a horizontal cross-section along the line 3—3 of Figure 1, and Figure 4 is an assembly view showing the means for driving the can actuating means within the retort.

Referring to the drawing in detail, it will be seen that my retort (1) rests on the horizontal plates (2) supported on the legs (3), the latter being braced by horizontal members (4). The retort consists of the middle or main section (6), a top section (7) hereinafter referred to as the inlet valve, and a bottom section (8), hereinafter referred to as the outlet valve. The main portion comprises a casing (9) of cylindrical form closed on top and at the bottom by the two plates (11) and (12) by means of bolts (14) connecting the edges of the plates with flanges (16) emanating from the top and the bottom of the casing. In the form shown in Figure 1, I divide the space enclosed in the casing into three parts by means of two plates (17) and (18) secured in spaced relation to the cylindrical wall of the casing parallel to the bottom and top plates. These plates are secured against rotary motion as shown in Figure 3 by means of a plurality of lugs (19) extending from their outer circumference and engaging vertical channels (21) secured with their backs to the inside of the casing and toeing toward the plates (17) and (18). These channels may be placed vertically above each other or in staggered relation so that the upper channels will not interfere with an upward motion of the lower plate.

The plates are held in spaced relation to each other by means of cylinders (22), (23) and (24), cylinder (24) being disposed between the bottom plate of the casing and plate (18), cylinder (23) being disposed between the two plates (17) and (18), and cylinder (24) being placed between the plate (17) and the top plate of the casing. The cylinders are concentric with the casing and are perforated so as to allow of the entrance of steam from the casing into the cylinders. The latter are also divided into preferably four compartments by means of two diametrical walls crossing each other at right angles at the center of the cylinders. I wish to point out that the particular number of compartments for each cylinder is of no importance since it might be worked with two or even with as many as five or six or more.

A vertical shaft (26) penetrates the casing and the plates and is provided with means hereinafter described for driving the same. The shaft is rotatably supported in the different plates disposed in vertical relation, but is rigidly secured to the central portion of the diametrical walls within the cylinders so that a revolving motion of the shaft will not effect the different plates but will cause the cylinders (22), (23) and (24) to rotate with the shaft.

The inlet valve (7), above referred to, is placed on top of the main casing and comprises a cylindrical portion (28) placed in alinement with the cylinders (22), (23) and (24) and secured to the main body by means of a plate (29), placed on top of the same and secured to the main body by means of bolts (31). In a similar manner is the outlet valve (8) fastened to the bottom of the main body. The intake and outlet valve cylinders are constructed in the same manner as the main body cylinders and rotated with the same.

The main principle involved in my invention is the providing of openings in each plate occupying a sector of the said plate and arranged in such a manner that no two succeeding sector openings are alined with each other and the introduction of the cans through one opening from where they are slowly transported to the opening in the next plate in order to drop through the latter opening into the next cylinder. For this purpose the top plate (29) is constructed as shown in the plan view of Figure 2, that is, an opening is provided in the plate occupying about one-fourth of the area of the top plate, and means are provided in the chute (33) for admitting cans into the valve cylinder (28) through this opening. Now this valve cylinder is divided into four compartments and is rotated step-wise by means described hereinafter so as to advance a quarter of a turn with each step. The opening provided in the plate (11) is not alined with the opening in the plate (29), but is preferably so arranged with reference to the latter opening that the particular compartment receiving cans through the latter opening does not reach the opening in the plate (11) until the valve cylinder is rotated through three-fourths of a turn. In this manner one compartment of the valve cylinder is filled on each quarter turn and another compartment is simultaneously emptied into the valve cylinder (24). In this cylinder the same process is repeated and in the same manner through the cylinders (23) and (22) so that each can admitted into the inlet valve travels in each compartment through a certain distance and is then dropped into the cylinder next below to again partake of the revolving motion of this compartment until dropped into the next one. During all this time steam is admitted into the casing through the pipe (36) and freely passes into the different cylinders and around the cans so as to heat and cook the same thoroughly.

For the removal of the cans I provide means similar to the inlet valve in the outlet valve (8), which latter is provided with an opening at its bottom in the proper place to allow the cans dropping into the outlet valve cylinder to travel within the same through a certain distance before approaching the opening. After reaching the opening the cans fall into any suitable hopper (37) and are led through the pipe (38) to the point of their destination.

The shaft (26) which extends vertically through the whole apparatus is driven by means of the horizontal shaft (39) engaging the same through the bevel gears (41) and (42), and the latter shaft (39) receives intermittent rotary motion from the shaft (43) by means of the wheel (44) secured on the shaft having a stud (45) extending sideways from its rim and engaging successively one of a plurality of structures (46) extending from the circumferential surface of the wheel (47) keyed to the shaft (39). The working of these shafts is so arranged that on each turn of the shaft (43) the shaft (26) is rotated through a quarter of a turn so that each compartment pauses under and above each opening a sufficient length of time to either receive the cans or to drop them into the next compartment.

It will be seen that the apparatus as constructed can be easily taken apart since the top valve can be taken out by removing the nuts from the bolts (31), the plate (11) can be removed by unscrewing the nuts (14) and the cylinders and plates can be successively pulled upwardly. I wish to call particular attention to the fact that I do not confine myself in any way to any number of compartments in the various cylinders nor to the particular arrangement of the openings in the plates, the only point insisted on being that the openings be arranged in staggered relation as aforesaid.

I claim:

1. In a cooking retort, a vertically disposed cylindrical casing having end members rigidly secured thereto, a vertical shaft centrally mounted therein, means for revolving the shaft, a plurality of cylinders having radial webs therein for dividing the cylinders into sectorial compartments slidably engaging the shaft and rotary therewith, a plate having a sectorial opening therein interposed between each two cylinders so that no two succeeding sectorial openings register, and means for preventing the plates from rotating comprising radial projections extending from the plates and vertical guide members engaging the projections.

2. In a cooking retort, a vertically disposed cylindrical casing having end members rigidly secured thereto, a vertical shaft centrally mounted therein, means for revolving the shaft, a plurality of cylinders having radial webs therein for dividing the cylinders into sectorial compartments slidably engaging the shaft and rotary therewith, a plate having a sectorial opening therein interposed between each two cylinders so that no two succeeding sectorial openings register, and means for preventing the plates from rotating comprising radial projections extending from the plates and vertical guide members engaging the projections with the guide members for succeeding plates disposed in staggered relation so as not to interfere with the removal of all the cylinders from the casing simultaneously.

FRANK B. DONNELLAN.